Dec. 13, 1960  A. GUDMUNDSEN  2,964,073
CHAIN SAW BAR
Filed Nov. 25, 1957  3 Sheets-Sheet 1
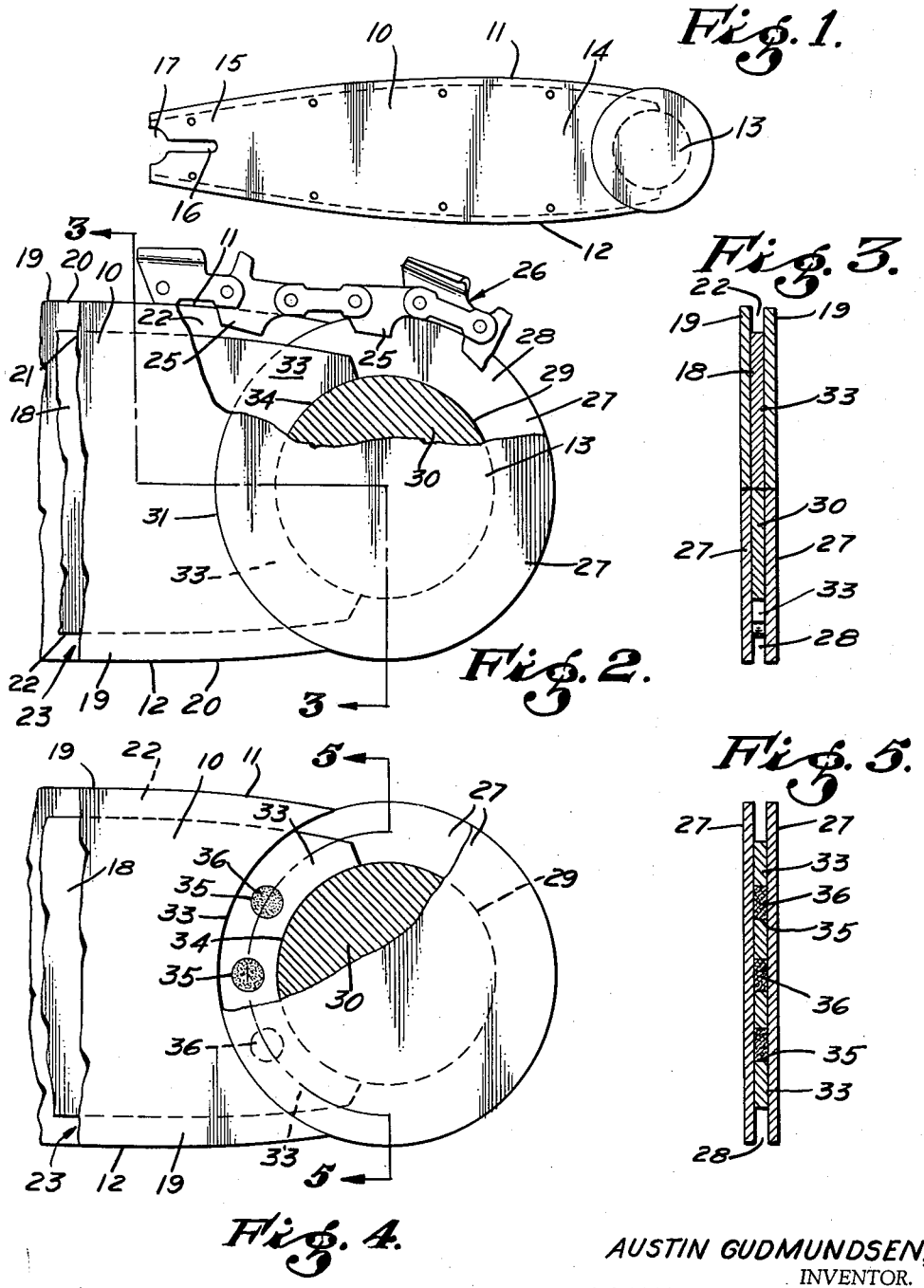
AUSTIN GUDMUNDSEN,
INVENTOR.
WHANN & McMANIGAL
Attorneys for Applicant Dec. 13, 1960
A. GUDMUNDSEN
2,964,073
CHAIN SAW BAR
Filed Nov. 25, 1957
3 Sheets-Sheet 2
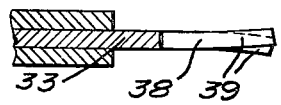
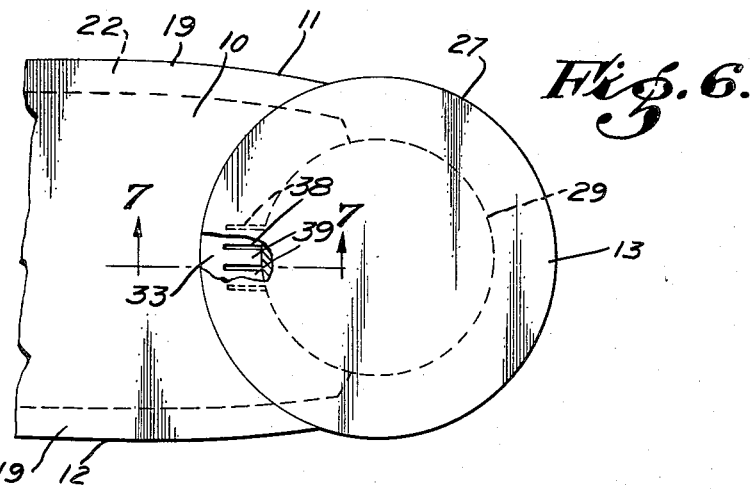
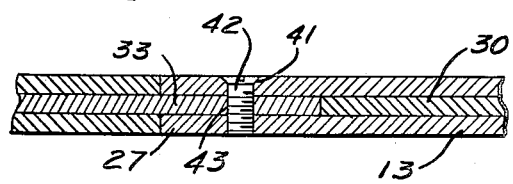
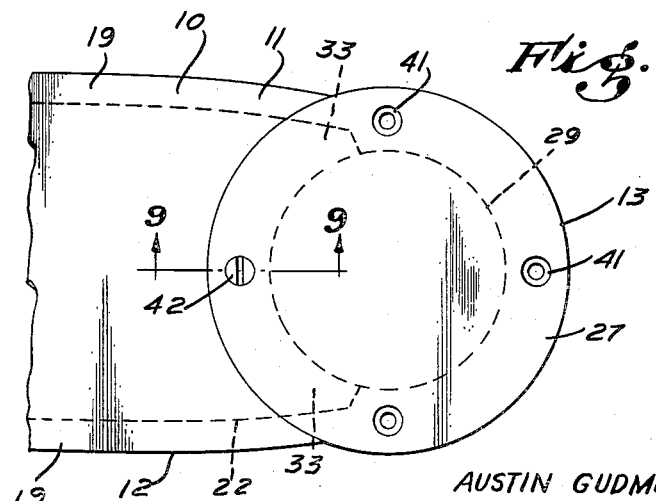
AUSTIN GUDMUNDSEN,
INVENTOR.
WHANN & McMANIGAL
Attorneys for Applicant

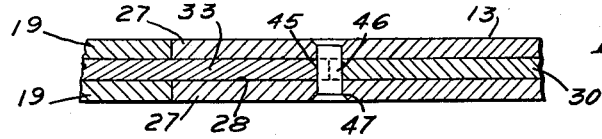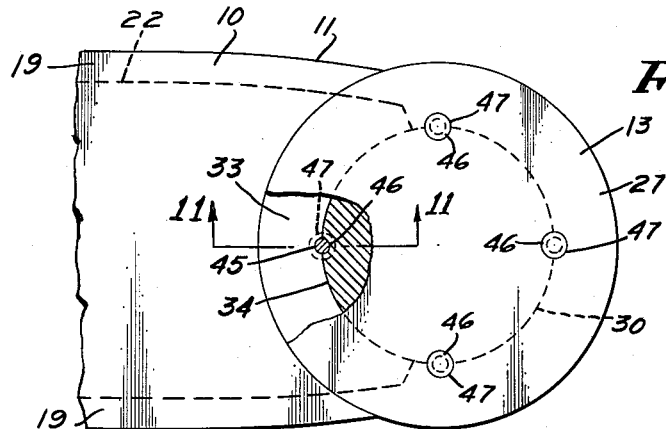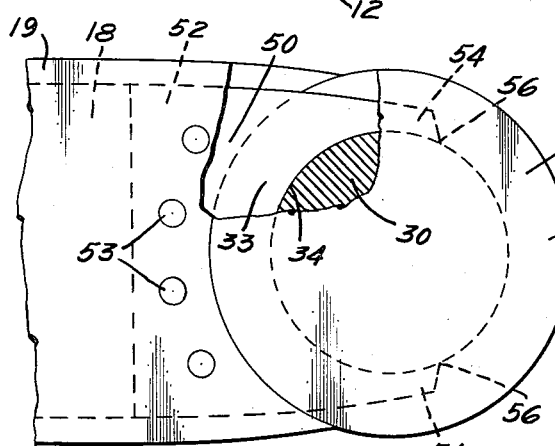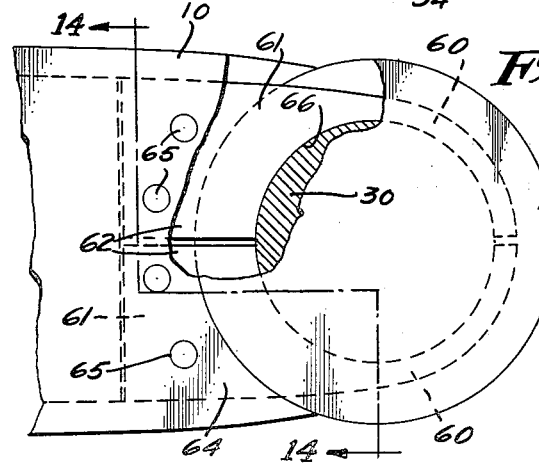

United States Patent Office 2,964,073
Patented Dec. 13, 1960

2,964,073

CHAIN SAW BAR

Austin Gudmundsen, Inglewood, Calif., assignor to Mc-Culloch Corporation, Los Angeles, Calif., a corporation of Wisconsin Filed Nov. 25, 1957, Ser. No. 698,435

2 Claims. (Cl. 143—32)

This invention relates to chain saws wherein the sawing action is accomplished by a saw chain having cutting teeth projecting from selected chain links, this saw chain being propelled around the edge of a bar structure which may be of solid or bow type.

It is an object of the invention to provide in a sawing device of this character a chain support including a bar structure and rotatable and/or adjustable means for guiding the chain as it moves from one edge portion of the bar structure to another.

It is an object of the invention to provide a saw chain support including an elongated saw bar having upper and lower edges provided with grooves to receive the center link extensions of the chain, and a wheel disposed between the ends of the upper and lower edges of the bar having a peripheral groove to receive the center link extensions of the chain and guide the same as the chain moves from one of the bar edges to the other, there being means for controlling the position of the wheel so that the wear of the chain thereon will be distributed.

In one form of the invention the wheel is supported on the bar so that it will rotate very slowly, thereby presenting different portions of the periphery of the wheel to the chain which travels thereover.

In another form of the invention the rotatably supported wheel is provided with detent or stop means making it possible to periodically rotate the wheel through a small angular distance, so as to bring new portions of the periphery of the wheel into position for engagement by the chain as the previously exposed portion has become worn by the movement of the chain thereover.

It is an object of the invention to provide a supporting structure for a chain saw, of the character described in the foregoing, having a tang extending from the bar structure into a portion of the peripheral groove of the wheel, this tang having the function of holding the wheel in operative relation to the bar structure.

It is a further object of the invention to provide a saw bar and end wheel structure of this character wherein the wheel is held in operative relation to the bar by a part which extends from the bar into the groove of the wheel through an angular distance greater than 180°, holding the wheel against movement from its operative position.

Further objects and advantages of the invention may be brought out in the following specification wherein some details have been described for the purpose of providing a complete disclosure of the invention, without intending to limit the scope of the invention which is defined by the appended claims.

Referring to the accompanying drawings which are for illustrative purposes only:

Fig. 1 is an elevational view, to reduced scale, of a support for a saw chain;

Fig. 2 is a view, to enlarged scale of the wheel end portion of the chain support, showing how the chain runs over the cooperating parts of the support;

Fig. 3 is a sectional view taken as indicated by the line 3—3 of Fig. 2;

Fig. 4 is an elevational view similar to Fig. 2 showing the use of brake means for controlling the rotation of the wheel;

Fig. 5 is a sectional view taken as indicated by the line 5—5 of Fig. 4;

Fig. 6 is a view similar to Fig. 4, showing another type of brake means;

Fig. 7 is a fragmentary sectional view taken as indicated by the line 7—7 of Fig. 6;

Fig. 8 is a fragmentary elevational view showing a form of the invention wherein the wheel is adjustable through different positions;

Fig. 9 is a fragmentary sectional view taken as indicated by line 9—9 of Fig. 8;

Fig. 10 is a fragmentary elevational view showing another means for controlling the position of the wheel;

Fig. 11 is a fragmentary sectional view taken as indicated by the line 11—11 of Fig. 10;

Fig. 12 is a fragmentary elevational view showing a form of the invention means acting independently of the chain to hold the wheel in its operative position at the end of the bar;

Fig. 13 is a fragmentary elevational view showing means for positively retaining the wheel on the end of the bar independently of the chain; and Fig. 14 is a sectional view taken as indicated by the line 14—14 of Fig. 13.

Referring to Figs. 1, 2 and 3, a preferred form of the invention includes a saw bar 10 having upper and lower edges 11 and 12 along which a saw chain travels. As shown in Figs. 1 and 2, there is a wheel 13 for guiding the chain from the extremity of the upper edge 11, around the front end 14 of the bar 10 to the lower edge thereof. The rear end 15 of the saw bar 10 has openings 16 for receiving attaching means, not shown, for securing the saw bar 10 to a saw structure. The leftward end 15 of the bar 10 has therein an arcuate depression 17 corresponding in general to the contour of the adjacent portion of the sprocket of the sawing device which engages the portion of the chain extending from the rear end 15 of the saw bar and imparts motion thereto so that the chain is caused to travel along the edges of the saw bar and around the outwardly presented portion of the wheel 13.

The saw bar 10 includes a center plate 18 and side plates 19 which are wider than the center plate 18 so that the edges 20 thereof will project beyond the edges 21 of the center plate 18 and define grooves 22 and 23 respectively along the upper and lower edges 11 and 12 of the bar 10 to receive the center link extensions 25 of a saw chain 26 which slides along the edges of the saw bar 10. The plates 19 and 20 are secured together by any suitable means such as rivets 24 or welds. The wheel 13 is of thickness corresponding to the thickness of the plate 10 and has circular flanges 27 thereon defining a peripheral groove 28 which is deeper than the grooves 22 of the saw bar 10. The groove 28 has a bottom wall 29 which is cylindrical and circumscribes the core 30 of the wheel.

The upper and lower edges 11 and 12 of the bar 10 have slight convex curvature and the ends of these edges converge toward each other, as shown in Fig. 2. The wheel 13 is of a diameter slightly greater than the distance across the front ends of the blade edges 11 and 12. The front edges 31 of the side plates 19 are concavely curved to receive in contact the outer edges of the wheel flanges 27. The front end of the center plate 18 extends beyond the front edges 31 of the side plates 19 to form a tang 33 which extends into the peripheral groove 28 of the wheel 13. This tang 33 has a concave front edge 34 to receive a portion of the core 30 of the wheel 13. The concave edge 34 has the same curvature as the bottom wall 29 of the groove 28 and rests in engagement therewith when the flanges 27 of the wheel 13 engage the curved edges 31 of the bar side plates 19.

The tang 33 rotatably supports the wheel 13, and the movement of the chain 26 around the wheel 13 frictionally applies a force which will rotate the wheel at a peripheral speed slower than the movement of the chain.

The form of the invention shown in Figs. 4 and 5 has means for applying a definite braking action to the wheel so that it will rotate at very slow speed. For simplification, those parts which have been previously described and identified by numerals in Figs. 2 and 3 will not be again described but will be merely identified by their numerals in Figs. 4 and 5. A number of openings 35 are formed in the tang 33, and friction elements 36 are disposed in the openings 35 in such positions that the outer faces thereof will engage the inner surfaces of the flanges 27. These friction elements, in the form of the invention disclosed, consist of felt plugs, saturated with a suitable lubricant and pressed into the openings 35 so that they restrict the rotation of the wheel to a creeping movement.

Figs. 6 and 7 are likewise similar to Figs. 2 and 3 and add thereto a different means for applying a braking action to the wheel 13. Therein spring elements are provided for engagement with the wheel 13 by forming slots 38 in the tang 33 so as to form tongues 39 which are bent laterally as shown in Fig. 7 so that they will have presural engagement with the inner surfaces of the flanges 27 of the wheel 13 and thereby frictionally retard rotation of the wheel 13.

As shown in Figs. 8 and 9, the invention contemplates that the wheel 13 may be normally retained stationary during periods of use of the chain saw, and periodically rotated or adjusted through angular distances so as to bring different portions of the flanges 27 into position for engagement by the chain. Spaced openings 41 are formed in the flanges 27 of the wheel 13 through which means may be extended for engagement with the tang 33 so as to prevent rotation of the wheel. The means of engagement referred to in the foregoing is shown as a screw 42 which passes through selected openings in the flanges 27, and, as shown in Fig. 9 is screwed into a threaded opening 43 in the tang 33. In Fig. 8, four sets of openings 41 are shown so that the wheel may be periodically adjusted through angles of 90° by merely removing the screw 42, rotating the wheel 13 and then reinserting the screw when a new set of openings 41 is aligned with the threaded opening 43 of the tang 33.

The periodic adjustment of the normally stationary wheel 13 may be affected as shown in Figs. 10 and 11 wherein the tang 33 has a notch 45 in the edge 34 thereof and the wheel is provided with a plurality of detents 46, spaced circularly around the core 30 of the wheel 13, adapted to separately engage the notch 45 as the wheel 13 is rotated from one of its positions of adjustment to the other. As shown in Fig. 11, the detents or projections 46 consist of rivets which have their end portions located in openings 47 located in the wheel 13 so as to pass across the bottom of the groove 28.

The tang 33 may be formed on a part 50 separate from the center plate 18 of the bar 10 as disclosed in Fig. 12. In this form of the device the center plate 18 is cut off along a transverse line disposed rearwardly from the front edges of the side plates 19, to provide a space between the forward portions of these side plates 19 to receive the rearward portion 52 of the member 50, after which the member 50 may be secured in place by screws or rivets 53 which pass through the side plates 19 and the member 52. It is a feature of the form of the invention shown in Fig. 12 to provide means for holding the wheel in place at the front end of the bar 10 by means other than the chain which extends around the exposed portion of the wheel 13. For this purpose the tang 33 of the plate 50 is provided with upper and lower extensions 54 which extend around the core 30 of the wheel 13 through an angle greater than 180°. The tips 56 of the extensions 54 are spaced apart a distance less than the diameter of the wheel core 30 and prevent removal of the wheel from its operative position unless the tips 56 of the extensions 54 are sprung outwardly.

In the form of the invention shown in Figs. 13 and 14, the wheel 13 is held in place at the front end of the bar 10 by arcuate means 60 which extend within the bottom of the groove 28 of the wheel 13 through an angular distance of nearly 360°. The curved members or fingers 60 are parts of plates 61 which are symmetrical about a horizontal center line. These plates have extensions 62 which extend into the space defined by the front ends 64 of the bar side plates 19, being therein held by screws or rivets 65. The plates 61 comprise cooperating sections which define an opening 66 to receive the core 30 of the wheel 13. The bar 10 and the wheel 13 are held together so as to form a chain support upon which the saw chain may be mounted. However, the wheel 13 is supported in such manner that it may be readily replaced.

I claim:

1. In a support for a saw chain having center link extensions: a saw bar having along the upper and lower edges thereof guide grooves to receive the center link extensions of a saw chain; circular guide means positioned at the front end of said bar and having side walls and a bottom wall defining a peripheral groove to receive center link extensions of the chain, said groove forming continuations of the guide grooves to guide the chain from one guide groove on said bar edges to the other guide groove, said side walls providing peripheral guide edges for supporting the chain in sliding engagement therewith, said guide means being of a thickness similar to that of said bar; means rotatably supporting said guide means on said bar including a tang extending outwardly from the front end of said bar and having a generally concave open end with said end corresponding in contour to the peripheral configuration of the bottom wall of said peripheral groove, said tang entering said groove to position said guide means on said bar; means cooperating with said tang and said guide means for releasably securing said guide means in respective selected positions of angular adjustment relative to the front end of said bar so that said guide means may be adjustably rotated to thereby bring respective portions of said guide means into position for engagement by said chain as the latter moves from one of said edges of the bar to the other.

2. In a support for a saw chain having center link extensions: a saw bar having along the upper and lower edges thereof guide grooves to receive the center link extensions of a saw chain; circular guide means positioned at the front end of said bar and having side walls and a bottom wall defining a peripheral groove to receive center link extensions of the chain and forming continuations of the guide grooves to guide the chain from one guide groove on said bar edges to the other guide groove, said side walls providing peripheral guide edges for supporting the chain in sliding engagement therewith, said guide means being of a thickness similar to that of said bar; means rotatably supporting said guide means on said bar including a tang extending outwardly from the front end of said bar and having a generally concave open end with said end corresponding in contour to the peripheral configuration of the bottom wall of said peripheral groove, said tang entering said groove to position said guide means on said bar; said circular guide means having openings at arcuately spaced positions thereon, said tang having an aperture in the portion thereof received within said groove; and fastener means selectively cooperable with the aperture in said tang and one of said openings so that said guide means may be adjustably rotated to thereby bring respective portions of said guide means into position for engagement by said chain as the latter moves from one of said edges of the bar to the other.

References Cited in the file of this patent

UNITED STATES PATENTS

| | | |
|---|---|---|
| 1,543,516 | Pray | June 23, 1925 |
| 2,532,981 | Wolfe | Dec. 5, 1950 |
| 2,642,100 | Quirke | June 16, 1953 |
| 2,693,206 | Anttonen | Nov. 2, 1954 |
| 2,728,566 | Barnett | Dec. 27, 1955 |

FOREIGN PATENTS

| | | |
|---|---|---|
| 103,356 | Austria | May 25, 1926 |
| 493,111 | Canada | May 26, 1953 |